United States Patent [19]
Smith et al.
[11] 3,813,653
[45] May 28, 1974

[54] MEMORY CELL WITH REDUCED VOLTAGE SUPPLY WHILE WRITING

[75] Inventors: John I. Smith, Sunnyvale; William R. McKinley, San Jose, both of Calif.
[73] Assignee: Rolm Corporation, Cupertino, Calif.

[22] Filed: Dec. 18, 1972
[21] Appl. No.: 316,102

[52] U.S. Cl. ........... 340/173 FF, 307/238, 307/291, 340/173 CP
[51] Int. Cl. .......................... G11c 11/40, G11c 7/00
[58] Field of Search .... 340/173 FF, 173 R, 173 CP; 307/238, 291

[56] References Cited
UNITED STATES PATENTS

| | | | |
|---|---|---|---|
| 3,644,907 | 2/1972 | Gricchi et al. | 340/173 FF |
| 3,656,010 | 4/1972 | Huyben et al. | 340/173 FF |
| 3,662,351 | 5/1972 | Ho et al. | 340/173 FF |

OTHER PUBLICATIONS

McDowell, Bilevel Power Storage Cell, IBM Technical Disclosure Bulletin, Vol. 14, No. 6, p. 1678, 11/71, S 2717 0012

*Primary Examiner*—Bernard Konick
*Assistant Examiner*—Stuart N. Hecker
*Attorney, Agent, or Firm*—Limback, Limbach & Sutton

[57] ABSTRACT

A semiconductor memory cell suitable for use in a memory matrix includes means for reducing the supply voltage to the flip-flop forming the memory cell during a write operation. The voltage is, however, maintained at a sufficiently high value to maintain the cell in a static mode of operation.

36 Claims, 4 Drawing Figures

MEMORY CELL WITH REDUCED VOLTAGE SUPPLY WHILE WRITING

BACKGROUND OF THE INVENTION

The present invention relates to memory cells, and in particular, to an improved semiconductor memory cell enabling more bits of information to be stored therein for a given area than prior art semiconductor memory cells.

The use of a pair of cross-coupled inverters for the storage of a single bit of information was first introduced by Eckles and Jordan in the year 1917. In their embodiment, they used, for each inverter, a single triod vacuum tube and a single resistor as a passive load. This circuit has since become widely used in the computer industry and is commonly referred to as the "flip-flop." Since the introduction of the semiconductor technology in the mid-1950's, hundreds of different embodiments of the flip-flop's circuit have been introduced and used throughout the industry. Flip-flop circuits are widely utilized to store binary information (bits).

A memory cell commonly used for this purpose is sometimes referred to as a five-transistor memory cell. The memory cell includes a flip-flop circuit utilizing four transistors. These are arranged in pairs to form two cross-coupled inverter circuits. The fifth transistor functions as a read/write switch to both interrogate the state of the flip-flop for reading out data and also, to drive the flip-flop to a desired binary state during a write operation.

As will be explained in greater detail subsequently, the read/write transistor is disproportionally larger in size than the four other transistors making up the remainder of the memory cell since it must have the current capacity to "over-ride" the other transistors making up the memory cell.

Large scale integration (LSI) is frequently used to manufacture memory cell matrices utilized in computers and other data-handling systems. Often these matrices contain hundreds or even thousands of memory cells. A major object in their fabrication is to provide as many cells as possible in the smallest amount of area. Because the read/write transistor in the five-transistor cell is so large relative to the other transistors, it can be seen that the over-all number of memory cells possible for a given area is significantly reduced in present memory circuits.

In the past, a number of techniques have been employed to change the circuit requirements and reduce the size of the read/write transistor. One of these, by Wood and Ball, described in the 1965 International Solid States Circuits Conference Journal, employs a sixth transistor in the feed-back path of the four transistor flip-flop. At the time it is desired to write data into the flip-flop, this transistor is turned off, causing the feed-back path to open and rendering it inoperative for a short period of time during which the flip-flop is steered to the desired level. This approach has the disadvantage that it requires a sixth transistor and, furthermore, an additional electrical connector operating as a control line through the memory matrix. Both of these appreciably increase the size of the memory cell itself.

A second approach has been taken by Gricchi and Hudson in U.S. Pat. No. 3,644,907 whereby, just prior to the time that it is desired to write information into the cell, the cell is turned off by lowering the supply voltage sufficiently close to the reference voltage, typically ground. The read/write transistor is turned on, setting the flip-flop to the desired level. The supply voltage is then returned to its original operating point and the circuit again becomes operative. Using such a technique, it is impractical to have a separate supply voltage switch for each cell in the memory matrix. Therefore, large numbers of cells must be turned off at the same time.

SUMMARY OF THE INVENTION

It is therefore an object of the invention to provide an improved static memory cell.

Another object of the invention is to provide an improved five transistor memory cell requiring a minimum of space.

Another object of the present invention is to provide an improved matrix of memory cells wherein the over-all number of memory cells for a given area is maximized.

Another object of the invention is to provide an improved memory cell which does not require more than five transistors.

Another object of the invention is to provide an improved memory cell which is maintained in the static mode of operation during all modes of its operation.

Another object of the invention is to provide an improved method of writing binary information into a semiconductor memory cell.

In accordance with the present invention the memory cell supply voltage is lowered prior to or at the time of a write operation. Consequently, the read/write transistor can be made smaller since less current is required to overcome the current handling capabilities of the memory cell when binary signals are read into the memory cell. Thus, the over-all memory cell size is reduced and it is possible to increase the memory cell density in a memory matrix or array.

While the voltage to the memory cell is reduced, it is not reduced below a value which would render the memory cell non-static. That is, the flip-flop circuit in the typical five-transistor memory cell is maintained conducting during the reduced voltage period.

The latter is accomplished by not reducing the supply voltage below a value which is greater than the absolute value of the largest of the thresholds of the transistors forming the flip-flop circuit.

In accordance with another aspect of the present invention, improved circuit means are provided for lowering the supply voltage to the desired value during the write operation. The lowered supply voltage is automatically maintained at the proper level relative to the transistor thresholds, despite changes or variations in the thresholds.

DESCRIPTION OF THE PREFERRED EMBODIMENTS

Figure 1:
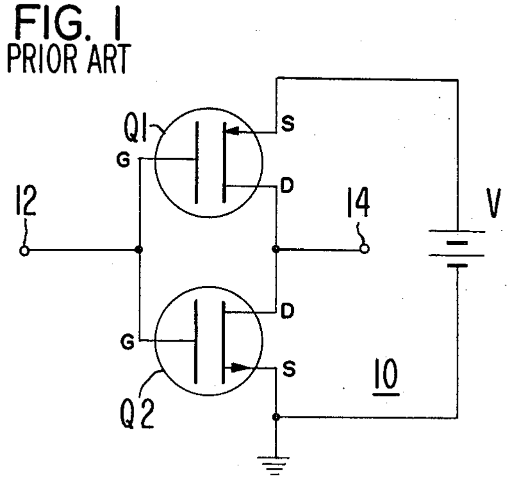
FIG. 1 PRIOR ART
FIG. 1 is a schematic representation of an inverter circuit.

FIG. 1 is a schematic representation of an inverter circuit 10 using a pair of complementary metal-oxide-silicon (MOS) transistors Q1 and Q2. Each transistor has a source node, S, a drain node, D, and a gate node, G. The flow of positive electric current from the source node to the drain node is controlled by the voltage applied to the gate node as measured with reference to the other two nodes.

As an example, the current flowing through transistor Q2 from its drain node to its source node is controlled by the voltage applied to the gate of that transistor. Current will begin to flow through the transistor when the voltage at the gate exceeds a minimum value when measured with respect to the source node. This minimum value is called the "threshold voltage."

The two transistors Q1 and Q2 in FIG. 1 are said to be complementary in that transistor Q1 is made from the opposite polarity semiconductor material than is Q2. In this representation, Q1 is a P-channel device whereas Q2 is said to be a N-channel device. Positive current will flow through Q1 from its source to the drain when a negative voltage, as measured with respect to its source, exceeds the threshold voltage level.

The inverter circuit 10 is formed from the pair of complementary MOS transistors Q1 and Q2 by electrically connecting the gate node of each of the two transistors to a common input node 12, and by electrically connecting the drain node of each of the two transistors to a common output node 14. The two source nodes are then connected to a supply voltage V. The supply voltage, V, is made to be greater than the sum of the absolute values of the threshold voltages of Q1 and Q2.

To explain the operation of an inverter circuit, consider the case where the input node 12 is at ground potential. This causes the gate of Q2 to be below the threshold voltage of Q2 and no current flows through Q2. However, the gate of Q1 is negative with respect to the source of Q1 and Q2 conducts current. With Q1 conducting and Q2 non-conducting, the output node 14 is electrically connected to the supply voltage, V.

Conversely, if the input node 12 is connected to the supply voltage V, Q1 conducts current, Q2 does not, and node 14 is electrically connected to the reference, or ground. Thus, the output 14 always assumes a level which is opposite to that applied to the input 12, and the circuit is said to invert the input signal.

It has been assumed that the source node and the drain nodes were unique. This is not necessarily so. In practice, the source node and the drain node can be built to be identical and the labeling of the two nodes as source and drain become somewhat arbitrary. The source node of Q2 is connected to ground or the most negative voltage in the circuit. Therefore, output 14 is always more positive than the source of Q2. However, should the potential at 14 become negative with respect to the source of Q2, then the functions of source and drain are interchanged and transistor Q2 will conduct current in the opposite direction. As an example, if 14 becomes negative, because, for example, of an externally supplied voltage, then when Q2 is turned on, positive current flows from ground to output 14 causing the output 14 to be pulled positive towards ground. This bi-directional action of the MOS transistor has been widely used in various switching and multiplex operations.

Figure 2:
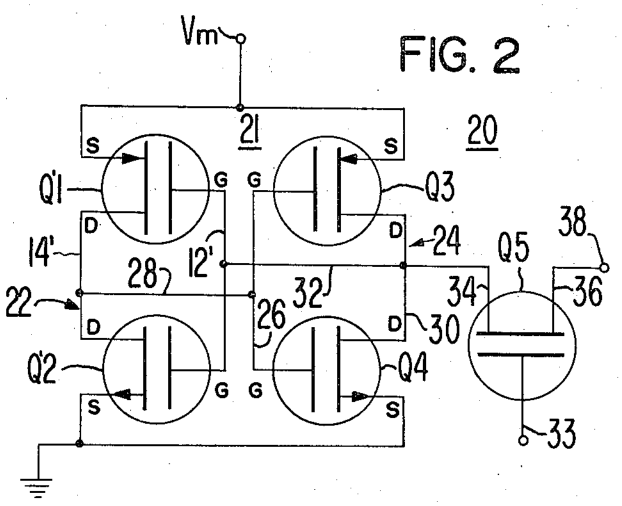
FIG. 2 is a schematic representation of a memory cell including a flip-flop circuit.

FIG. 2 is a schematic representation of a memory cell 20 including flip-flop circuit 21, formed by the cross-coupling of two complementary MOS (CMOS) inverter circuits 22 and 24. The output 14' of the first inverter circuit 22 formed by Q1' and Q2' is electrically connected to the input 26 of the second inverter circuit 24, formed by Q3 and Q4 to form node 28. Also, the output 30 of the second inverter 24 is connected to the input 12' of the first inverter 22 to form a second node 32. The sources, S, of transistors Q1 and Q3 are connected to a reference node, ground, and the sources of transistors Q2 and Q4 to voltage supply, $V_m$.

Circuit 21, like all flip-flop circuits, has two stable states. The first is when node 32 is low or at the reference point and node 28 is high or at the supply voltage level $V_m$. The second stable state is when 28 is low and 32 is high. These two stable states obey the rules for an inverter circuit in that the inverter circuit's output node is always at a level that is opposite the level of its input node. Because the two nodes 28 and 32 of the flip-flop circuit 21, are always in opposition, it is only necessary to examine one of these nodes to determine the state of the flip-flop circuit 21. That state is always either high or low, rendering the circuit capable of storing one bit of binary information.

The simplest switch that could be used to examine the output node, 32, of the flip-flop circuit 21 is a single MOS transistor Q5, consisting of a gate node 33 and two identical nodes 34 and 36. Which of these nodes acts as source and which as a drain is determined by the relative voltages applied to node 32 and input 28. In either case, the least positive node acts as the source.

The combination of Q5 with the flip-flop circuit 21 is referred to as the five-transistor memory cell 20. Cell 20 stores one bit of binary information. With Q5 off, the memory cell 20 retains its stored information as long as the supply voltage, $V_m$, remains connected. In this sense cell 20 is said to be static in that once information is stored into it, no further electrical action is required to retain that information. In contrast, dynamic memory cells store information in a volatile manner and the information must be continually interrogated and restored. With most dynamic cells, this restoration must be accomplished hundreds, and sometimes thousands, of times a second to avoid losing data.

In the five transistor static cell 20, once information has been written into the cell, no further action is required for retention. To interrogate, or read, the contents of the memory cell, Q5 is turned on by applying a positive voltage to the gate node of Q5 and sensing the resulting action at 38. If, at the beginning of an interrogation node 32 is low, then node 38 is pulled low by electrically connecting it to the reference node, here ground, through transistor Q5 and transistor Q4. If the voltage at node 32 is high, then node 38 is pulled high by the electrical connection of node 38 to the supply voltage $V_m$ through transistor Q5 and Q3. The fact that Q5 can connect node 38 either to the reference node, ground, or to the supply node $V_m$, is a consequence of the bi-directional capabilities of the MOS transistor.

Information is written into the memory cell 20 by clamping node 38 to either the reference (ground), or the supply node ($V_m$), depending upon the desired state of the memory cell, and turning on the transistor Q5 by applying a positive voltage to its gate. By making Q5 large enough so that it can overcome the current handling capabilities of either Q4 or Q3, node 32 can be forced to whatever voltage node 38 was clamped to and, after Q5 is turned off, node 32 remains at that level because of the bi-stable characteristics of the flip-flop circuit 21.

The fact that Q5 must be large enough to overcome the current handling capabilities of Q4 or Q3 is the major drawback of the five transistor cell. Because of the high loop gain inherent in the positive feedback within the flip-flop circuit, and because of gain considerations such as body effect, it must be many times larger than Q4 for the circuit to work. In designing a memory array consisting of hundreds, and even thousands, of memory cells utilizing large scale integration (LSI) techniques, it is imperative that the cell be made as small as physically possible. For each process there is a so-called "minimum" size transistor. This is the physically smallest operational transistor that can be made with that process. The ideal static cell, therefore, would be a cell comprised of five minimum transistors. However, if Q5, because of circuit considerations, must be made many times the size of Q4, the size of the resulting cell 20 is much greater than the minimum cell that the process could yield.

In accordance with the present invention, the supply voltage $V_m$ is lowered to a level that reduces the size requirements of Q5 to an acceptable level but does not allow the flip-flop circuit 20 to drop out of the static mode.

In practice, the flip-flop 21 stays in the static mode as long as the supply voltage $V_m$ is not reduced below a level which is greater than the absolute value of the largest of the transistors forming the flip-flop. Since, in LSI fabrication, it is to be expected that the values of the two P-channel transistors Q1 and Q3 and the two N-channel transistors Q2 and Q4 will be identical, then this means that $V_m$ can't be reduced below a value less than the absolute value of the larger of the thresholds of Q3 or Q4. It has been found in practice that if the supply voltage is reduced to a value that is twice this minimum, then the Q5 is reduced to a value or size of only approximately twice that of the minimum transistor in flip-flop 21. Furthermore, using this scheme, there is no requirement that supply voltage be lowered prior to the start of the write cycle; it can be done coincident with that.

Figure 3:
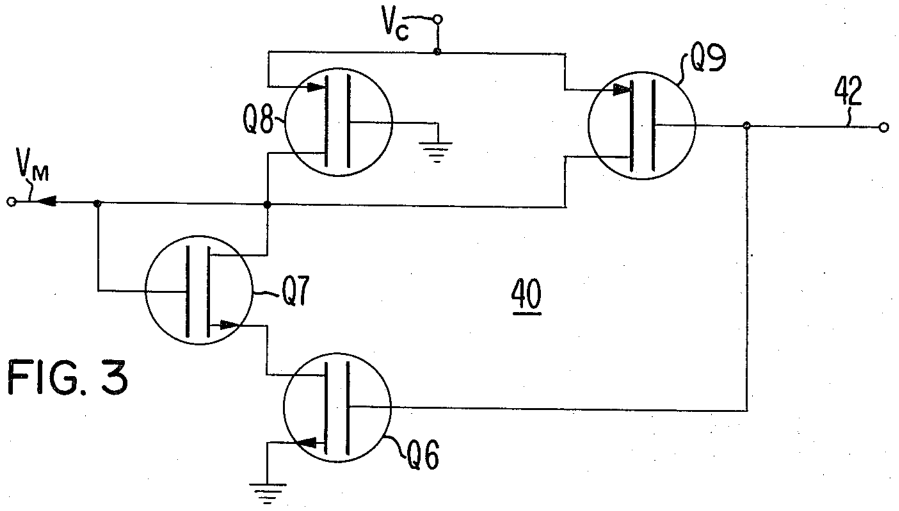
FIG. 3 is a schematic diagram of a voltage control circuit for use with the memory cell of FIG. 2.

A major problem with this approach is determining $V_m$ to which the supply voltage should be lowered since this level varies with the threshold levels of the Q3 and Q4 on the semiconductor chip and can vary from chip to chip. By using the control circuit 40 in FIG. 3 to generate the $V_m$ level, variations in thresholds are automatically accounted for. One control circuit 40 forming a memory matrix is used to provide $V_m$ to a plurality of memory cells 20.

In a write operation, one memory cell is to be set to a known condition, while the remaining cells are to remain in their previous state. Prior to a write operation, an N-channel MOS transistor Q9 is conducting, clamping the $V_m$ line to the $V_c$, the voltage source for all circuits on the memory matrix chip other than the memory cells themselves. Once the input 42 has been raised, Q9 no longer conducts and the $V_m$ line is no longer clamped to $V_c$. At the same time N-channel MOS transistor Q6 turns on and starts to conduct current. Because the gate of Q7 has been high N-channel MOS transistor Q7 also starts to conduct current, thus discharging the $V_m$ line towards the ground (reference) voltage. However, the $V_m$ line does not discharge completely to ground because of the counter-action of P-channel MOS transistor Q8 on Q7. In effect, the combination of Q7 and Q8 act as a non-linear voltage divider. The voltage drop across Q6 is made negligibly small by making Q3 physically very large compared with Q7 and Q8.

The voltage level of $V_m$ is selected to be any level between $V_c$ and the ground (reference) voltage by proper ratio of the sizes of Q7 and Q8. In one actual embodiment, Q7 is made much larger than Q8, making its impedance lower and hence the voltage across it smaller than across Q8. Under these circumstances, the voltage drop across Q7 is linear over the range of operation of the circuit due to environmental-causing changes to the transistor thresholds in the memory array. Additionally, variations in thresholds between the silicon wafers and memory arrays are automatically compensated for.

At the end of the memory cycle, the input 42 is returned to the ground (reference), Q6 is turned off, transistor Q9 is again turned on and the $V_m$ line is returned to the $V_c$ level.

Figure 4:
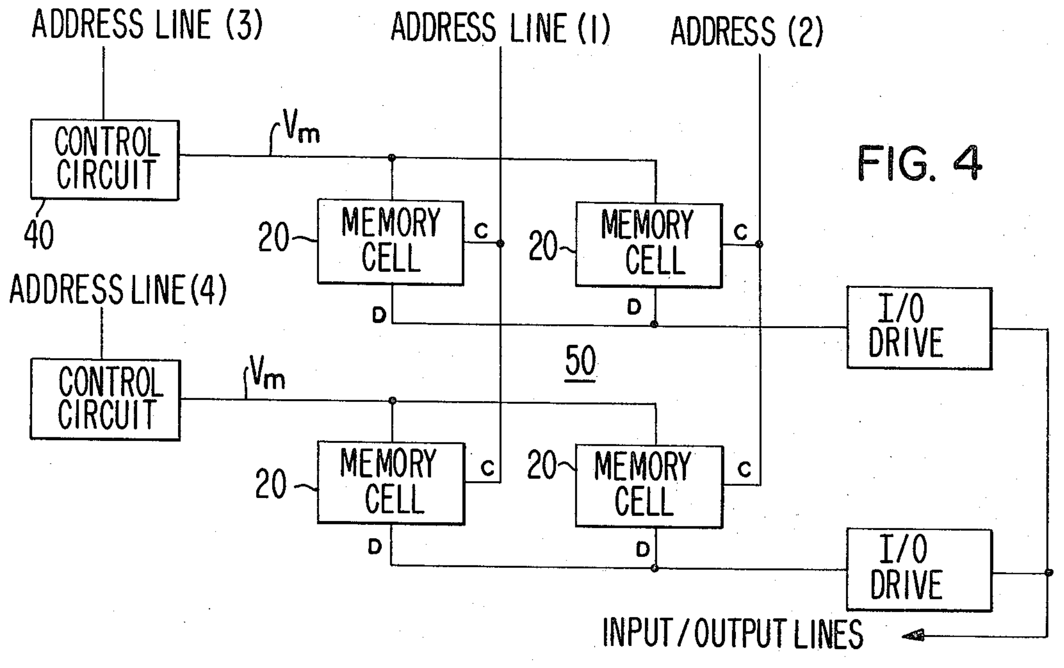
FIG. 4 represents schematically a matrix for memory cells in a two-by-two memory matrix.

FIG. 4 represents schematically a matrix 50 of four memory cells 20 in a two-by-two memory matrix. Each of the two rows has a control circuit 40 like that shown in FIG. 3 to generate the supply voltage $V_m$ for the memory cells 20 in that row. The gates of Q5 transistors in each of the memory cells 20 in a column are connected to an address line and each of the outputs of the Q5 transistors in each row are tied to a common set of I/O driver circuits. Access to any cell in a matrix, therefore, can be made by selecting one column address line and one set of row lines. During a read across to a given memory cell 20, to read data from the cell, the $V_m$ line is not changed and the data is read from the cell 20 to the input/output lines. However, during a write access to the cell, to store data into the cell, the $V_m$ line for the selected row is lowered, allowing the selected cell 20 to be set by the smaller Q5 transistor. The unselected cell on that row remain in the static mode and its stored data remains unchanged.

Matrix 50 in FIG. 4 is a simplified matrix showing only four memory cells 20. In one actual embodiment, a matrix of 512 memory cells comprises 32 columns and 16 rows. One control circuit 40 is provided for each 32 memory cells. However, a matrix of 16 × 32 is no limitation. The limit to the number of memory cells that can be practically arranged on a single chip is directly related to the size of the cell itself.

The advantage of the use of the five-transistor memory cell in accordance with the present invention is that it always remains in the static mode and never resorts to the dynamic mode during a write operation. This advantage manifests itself in the elimination of all critical timing requirements for the memory matrix allowing it to be operated at any speed from D.C. to the maximum determined by circuit propagation times. Advantages are also gained in memory information reliability over extreme temperature ranges by eliminating the requirement that the information be stored in a volatile mode which is susceptible to current leakage particularly at elevated temperatures.

We claim:

1. The method of storing binary data in a semiconductor memory cell including a flip-flop circuit of cross-coupled inverter circuits and a read/write switch, comprising the steps of: reducing the normal supply voltage to said flip-flop circuit to a level to maintain the memory cell in the static mode; storing binary signals transmitted through said read-write switch in said flip-flop circuit; maintaining said flip-flop conducting during the reduced voltage period, and re-establishing the normal supply voltage to said flip-flop after the binary signals are stored in said flip-flop circuit.

2. The method of storing binary data in a semiconductor memory cell including a flip-flop circuit of cross-coupled inverter circuits each comprising a pair of complimentary MOS transistors and a read/write transistor switch, comprising the step of: reducing the normal supply voltage to said flip-flop circuit to a value at least as great as the absolute value of the threshold voltage of the largest of the transistors forming said flip-flop circuit when binary signals transmitted through said read/write transistor switch are to be stored in said flip-flop circuit.

3. A matrix of memory cells arranged in rows and columns wherein each memory cell comprises flip-flop circuit comprising a pair of cross-coupled inverter circuits each formed of a pair of transistors, and a transistor for enabling binary data to be read from, or stored within the flip-flop circuit and including a voltage supply means for lowering the voltage of a row of memory cells during a write operation to a voltage sufficiently high to maintain the said row of memory cells in the static mode, said row including a said memory cell into which a binary signal is to be stored, and wherein said binary signal to be stored is transmitted through said transistor to said memory cell.

4. A matrix of memory cells as in claim 3 wherein said pairs of transistors forming said inverter circuits comprise complimentary MOS transistors.

5. A matrix of memory cells as in claim 4 wherein said voltage supply means includes means for lowering the supply voltage to a value at least as great as the absolute value of the largest voltage threshold of the transistors comprising the flip-flop circuit.

6. A matrix of memory cells as in claim 5 wherein said voltage supply means comprises:

a. a voltage source;

b. a voltage divider circuit comprising at least first and second serially connected transistors, said first transistor being connected to said voltage source, and wherein the junction between said first and second transistors defines an output node;

c. a third transistor connected between said second transistor and a reference voltage, said third transistor being normally-nonconductive;

d. a fourth transistor, connected between said voltage source and said output supply voltage node, which is normally conducting so that the voltage at said output supply voltage node is normally the same as said voltage source; and e. means for turning off said fourth transistor and turning on said third transistor during a write operation so that current flows through said voltage divider and the voltage at said output node is determined by the relative impedances of the transistors forming the voltage divider circuit.

7. A matrix of memory cells as in claim 6 including means for automatically regulating the supply voltage to compensate for changes in the threshold values of said transistors in said row.

8. A matrix of memory cells as in claim 7 wherein said automatic regulating means comprises connecting the gate of said second complimentary MOS transistor to said output supply voltage node.

9. A circuit for lowering the supply voltage to one or a plurality of semiconductor memory cells during a write operation, comprising:

a. a voltage source;

b. a voltage divider circuit comprising at least first and second serially connected transistors, said first transistor being connected to said voltage source, and wherein the junction between said first and second transistors defines an output node;

c. a third transistor connected between said second transistor and a reference voltage, said third transistor being normally-nonconductive;

d. a fourth transistor, connected between said voltage source and said output supply voltage node, which is normally conducting so that the voltage at said output supply voltage node is normally the same as said voltage source; and e. means for turning off said fourth transistor and turning on said third transistor during a write operation so that current flows through said voltage divider and the voltage at said output node is determined by the relative impedances of the transistors forming the voltage divider circuit.

10. A circuit as in claim 9 wherein the third transistor is comparatively larger in size than said first and second transistors so that the voltage drop thereacross is small relative to that across said first and second transistors during a write operation.

11. A circuit as in claim 10 wherein the size of said second transistor is relatively large compared with said first transistor so that there is a greater voltage drop across said first transistor during a write operation.

12. A circuit as in claim 9 wherein each memory cell includes a flip-flop comprising four transistors and wherein said supply voltage lowering means includes means for lowering the supply voltage to a value at least as great as the absolute value of the largest voltage threshold of the transistors comprising said binary flip-flop.

13. A circuit as in claim 12 wherein said flip-flop transistors comprise pairs of complimentary MOS transistors.

14. A circuit as in claim 13 including means for automatically regulating the supply voltage during the reduced voltage period to compensate for changes in threshold values of the transistors forming said memory cells.

15. A circuit as in claim 14 wherein said automatic regulating means comprises connecting the gate of said second transistor of said supply voltage lowering circuit to said output supply voltage node thereof.

16. A circuit as in claim 9 wherein each memory cell includes a flip-flop comprising four transistors and wherein said supply voltage lowering means includes means for lowering the supply voltage to a value of approximately twice as great as the absolute value of the largest voltage threshold of the transistors comprising the binary flip-flop.

17. A circuit as in claim 16 wherein said flip-flop transistors comprise pairs of complimentary MOS transistors.

18. A circuit as in claim 17 including means for automatically regulating the voltage during the reduced voltage period to compensate for changes in threshold values of the transistors forming said memory cells.

19. A circuit as in claim 18 wherein said automatic regulating means comprises connecting the gate of said second transistor of said supply voltage lowering circuit to said output supply voltage node thereof.

20. In a static binary semiconductor memory cell operable in a read and write mode which comprises a. a binary flip-flop comprising i. first and second binary logic invertor circuits each having an input and an output and each connected between a supply voltage and a reference voltage;

ii. first means for connecting the output of said first inverter circuit with the input of said second inverter circuit and defining a first node thereat, iii. second means for connecting the input of said first inverter circuit with the output of said second inverter circuit and defining a second node thereat, said second node defining the output of said binary flip-flop, and b. read/write switching means having an output connected to said first node, means for rendering the same conducting during a read operation to enable the binary state of said flip-flop to be determined at the input thereof, and means for rendering the same conducting during a write operation to enable binary signals provided at the input thereof to be sent to said flip-flop circuit to set the binary state thereof, and wherein the improvement comprises: means for lowering the supply voltage to said flip-flop circuit during a write operation to reduce the current therethrough while maintaining said memory cell in the static mode.

21. A static binary semiconductor memory cell as in claim 20 wherein said first and second binary logic inverter circuits each comprise a pair of MOS transistors, and said read/write switching means also comprises an MOS transistor.

22. A static binary semiconductor memory cell as in claim 21 wherein said supply voltage lowering means includes means for lowering the supply voltage to a value at least as great as the absolute value of the largest voltage threshold of the transistors comprising the binary flip-flop.

23. A static binary semiconductor memory cell as in claim 22 wherein said pairs of MOS transistors comprise complimentary MOS transistors.

24. A static binary semiconductor memory cell as in claim 22 including means for automatically regulating the supply voltage during the reduced voltage period to compensate for changes in threshold values of said transistors forming the memory cell.

25. A static binary semiconductor memory cell as in claim 21 wherein said supply voltage lowering means includes means for lowering the supply voltage to a value of approximately twice as great as the absolute value of the largest voltage threshold of the transistors comprising the binary flip-flop.

26. A static binary semiconductor memory cell as in claim 25 wherein said pairs of MOS transistors comprise complimentary MOS transistors.

27. A static binary semiconductor memory cell as in claim 26 including means for automatically regulating the supply voltage during the reduced voltage period to compensate for changes in threshold values of said transistors forming the memory cell.

28. A static binary semiconductor memory cell as in claim 20 wherein said supply voltage lowering means comprises:

a. a voltage source;

b. a voltage divider circuit comprising at least first and second serially connected transistors, said first transistor being connected to said voltage source, and wherein the junction between said first and second transistors defines an output node;

c. a third transistor connected between said second transistor and a reference voltage, said third transistor being normally-nonconductive;

d. a fourth transistor, connected between said voltage source and said output supply voltage node, which is normally conducting so that the voltage at said output supply voltage node is normally the same as said voltage source; and e. means for turning off said fourth transistor and turning on said third transistor during a write operation so that current flows through said voltage divider and the voltage at said output node is determined by the relative impedances of the transistors forming the voltage divider circuit.

29. A static binary semiconductor memory cell as in claim 28 wherein said supply voltage means includes means for lowering the supply voltage to a value at least as great as the absolute value of the largest voltage threshold of the transistors comprising the binary flip-flop.

30. A static binary semiconductor memory cell as in claim 29 wherein each of said binary logic inverter circuits comprises a pair of complimentary MOS transistors.

31. A static binary semiconductor memory cell as in claim 30 including means for automatically regulating the supply voltage during the reduced voltage period to compensate for changes in threshold values of said transistors forming the memory cell.

32. A static binary semiconductor memory cell as in claim 31 wherein said automatic regulating means comprises connecting the gate of said second transistor of said supply voltage lowering means to said output supply voltage node thereof.

33. A static binary semiconductor memory cell as in claim 28 wherein said supply voltage lowering means includes means for lowering the supply voltage to a value of approximately twice as great as the absolute value of the largest voltage threshold of the transistors comprising the binary flip-flop.

34. A static binary semiconductor memory cell as in claim 33 wherein each of said binary logic inverter circuits comprises a pair of complimentary MOS transistors.

35. A static binary semiconductor memory cell as in claim 34 including means for automatically regulating the supply voltage during the reduced voltage period to compensate for changes in threshold values of said transistors forming the memory cell.

36. A static binary semiconductor memory cell as in claim 35 wherein said automatic regulating means comprises connecting the gate of said second transistor of said supply voltage lowering means to said output supply voltage node thereof.

* * * * *